US012006389B2

(12) United States Patent
Ono et al.

(10) Patent No.: US 12,006,389 B2
(45) Date of Patent: *Jun. 11, 2024

(54) MODIFIED POLYOLEFIN RESIN

(71) Applicant: NIPPON PAPER INDUSTRIES CO., LTD., Kita-ku (JP)

(72) Inventors: Isamu Ono, Tokyo (JP); Kei Kondo, Tokyo (JP); Koji Kimura, Tokyo (JP); Takato Takenaka, Tokyo (JP); Yuuko Nahara, Tokyo (JP); Shunji Sekiguchi, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 432 days.

This patent is subject to a terminal disclaimer.

(21) Appl. No.: 17/413,697

(22) PCT Filed: Nov. 26, 2019

(86) PCT No.: PCT/JP2019/046149
§ 371 (c)(1),
(2) Date: Jun. 14, 2021

(87) PCT Pub. No.: WO2020/129550
PCT Pub. Date: Jun. 25, 2020

(65) Prior Publication Data
US 2022/0017671 A1  Jan. 20, 2022

(30) Foreign Application Priority Data
Dec. 21, 2018 (JP) .................. 2018-239141

(51) Int. Cl.
*C08F 255/08* (2006.01)
(52) U.S. Cl.
CPC .................. *C08F 255/08* (2013.01)
(58) Field of Classification Search
CPC .... C08F 255/04; C08F 255/02; C08F 222/06; C08F 220/1812
See application file for complete search history.

(56) References Cited

U.S. PATENT DOCUMENTS

| 4,315,863 | A | * | 2/1982 | Tomoshige | ........... | C08F 255/00 |
| | | | | | | 549/233 |
| 7,304,111 | B2 | | 12/2007 | Onoe et al. | | |
| 2004/0116569 | A1 | | 6/2004 | Ward et al. | | |

FOREIGN PATENT DOCUMENTS

| JP | 10-330561 A | 12/1998 | | |
| JP | 2001-114843 A | 4/2001 | | |
| JP | 2003-277481 A | 10/2003 | | |
| JP | 2004-269872 A | 9/2004 | | |
| JP | 2012-52039 A | 3/2012 | | |
| JP | 2014-210842 A | 11/2014 | | |
| JP | 2018-150482 A | 9/2018 | | |
| WO | WO-2018037849 A1 | * | 3/2018 | ............. C08F 10/00 |
| WO | WO 2020/090818 A1 | | 5/2020 | |

OTHER PUBLICATIONS

International Search Report dated Jan. 7, 2020 in PCT/JP2019/046149 filed Nov. 26, 2019, 2 pages.
Japanese Decision of Refusal dated Oct. 20, 2020 in Japanese Patent Application No. 2018-239141 filed Dec. 21, 2018, 5 pages (with English Translation).
Japanese Notice of Reasons of Refusal dated Jun. 9, 2020 in Japanese Patent Application No. 2018-239141 filed Dec. 21, 2018, 4 pages (with English Translation).
B. De Roover, et al., "Molecular Characterization of maleic Anhydride-Functionalized Polypropylene", Journal of Polymer Sciences: Part A: Polymer Chemistry, vol. 33, 1995, pp. 829-842.

* cited by examiner

*Primary Examiner* — Mark S Kaucher
(74) *Attorney, Agent, or Firm* — Oblon, McClelland, Maier & Neustadt, L.L.P.

(57) ABSTRACT

A modified polyolefin resin may be capable of obtaining an intended adhesion strength regardless of a kind of a base resin thereof even when graft modification is carried out by using an $\alpha,\beta$-unsaturated carboxylic acid derivative having a cyclic structure. Such a modified polyolefin resin may be a modified product of a polyolefin resin and satisfying (A) and (B): (A): a modifying component includes an $\alpha,\beta$-unsaturated carboxylic acid derivative having a cyclic structure; and (B): a ring-opening degree expressed by formula (1) is 40 or more:

ring-opening degree=modification degree $K\times$ring-opening rate $R$     (1), wherein, in formula (1), the modification degree $K$ is a grafting weight (% by weight) of the $\alpha,\beta$-unsaturated carboxylic acid derivative, and the ring-opening rate $R$ is a ring-opening rate (%) of the cyclic structure in the $\alpha,\beta$-unsaturated carboxylic acid derivative.

20 Claims, No Drawings

MODIFIED POLYOLEFIN RESIN

CROSS-REFERENCE TO RELATED APPLICATIONS

The present application is the national stage of international application PCT/JP2019/046149, filed on Nov. 26, 2019, and claims the benefit of the filing date of Japanese Appl. No. 2018-239141, filed on Dec. 21, 2018, the content of each of which is incorporated by reference.

FIELD

The present invention relates to a modified polyolefin resin.

BACKGROUND

Polyolefin resins such as polypropylene and polyethylene are excellent in mechanical properties such as a tensile strength, a tear strength, and an impact strength, as well as in a water resistance and a chemical resistance. In addition, polyolefin resins are not only light and cheap but also excellent in various properties such as moldability. Therefore, polyolefin resins are used in various uses such as a sheet, a film, and a molded article. On the other hand, unlike acryl resins and polyester resins, these polyolefin resins are nonpolar and have high crystallinity; thus, they have drawbacks that painting and adhesion thereof are difficult.

A chlorinated polyolefin resin is widely used as a polyolefin resin whose adhesion property to a nonpolar resin substrate is improved. However, the chlorinated polyolefin resin is considered improper for adhesion between a polyolefin resin and a metal because they have a problem in that hydrochloric acid is released.

Therefore, for adhesion between a polyolefin resin and a metal, an acid-modified polyolefin resin based on a non-aqueous dispersion type is generally used.

On top of this, in recent years, uses requiring a high heat resistance are increasing. In order to meet his requirement, use of a resin having a comparatively high melting point has been known (for example, see Patent Literature 1). According to the technology described in Patent Literature 1, including a high melting point resin can enhance heat resistance, but this causes deterioration in solution stability under a certain circumstance.

Therefore, a modified polyolefin resin that is heat resistant and has an excellent solution stability has been proposed (for example, see Patent Literature 2).

CITATION LIST

Patent Literature

Patent Literature 1: Japanese Patent Application Laid-open No. 2014-210842
Patent Literature 2: Japanese Patent Application Laid-open No. 2018-150482

Non-Patent Literature

Non-patent Literature 1: B. De Roover et al., "Molecular characterization of maleic anhydride-functionalized polypropylene", Journal of Polymer Science, Vol. 33, Issue 5, pp. 829-842 (1995)

SUMMARY

Technical Problem

The modified polyolefin resin described in Patent Literature 2 uses polyolefin resins having different melting points and graft-modified by an $\alpha,\beta$-unsaturated carboxylic acid anhydride such as maleic anhydride.

The modified polyolefin resin in Patent Literature 2 uses polyolefin resins having different melting points as the base resins thereof, and thus, this lacks versatility. In addition, it has been known that graft-modification using an unsaturated carboxylic acid such as maleic anhydride or an anhydride monomer thereof causes degradation of the polymer (decrease in molecular weight) (for example, see Non-patent Literature 1), thereby in turn causing deterioration in an adhesion strength under a certain circumstance.

An object of the present invention is to provide a modified polyolefin resin having an intended adhesion strength regardless of a kind of a base resin thereof even when graft modification is carried out by using an $\alpha,\beta$-unsaturated carboxylic acid derivative having a cyclic structure.

Solution to Problem

The Inventors of the present invention carried out an extensive investigation to achieve this object. As a result, in a modified product of a polyolefin resin, they found that the object could be achieved by specifying a numerical value of a ring-opening degree with a prescribed numeral formula. The present invention was completed on the basis of this finding.

Namely, the present invention provides the following [1] to [3].

[1] A modified polyolefin resin, the modified polyolefin resin being a modified product of a polyolefin resin and satisfying following conditions (A) and (B):

condition (A): a modifying component comprises an $\alpha,\beta$-unsaturated carboxylic acid derivative having a cyclic structure; and condition (B): a ring-opening degree expressed by following formula (1) is 40 or more, $$\text{Ring-opening degree} = \text{modification degree } K \times \text{ring-opening rate } R \quad (1):$$

(in the formula (1), the modification degree K represents a grafting weight (% by weight) of the $\alpha,\beta$-unsaturated carboxylic acid derivative, and the ring-opening rate R represents a ring-opening rate (%) of the cyclic structure in the $\alpha,\beta$-unsaturated carboxylic acid derivative).

[2] The modified polyolefin resin according to [1], wherein the modified polyolefin resin has a melting point of 50° C. or higher.

[3] The modified polyolefin resin according to [1] or [2], wherein the modified polyolefin resin has a weight-average molecular weight of 10,000 or more.

Advantageous Effects of Invention

In the modified polyolefin resin according to the present invention, even when graft modification is carried out by using an $\alpha,\beta$-unsaturated carboxylic acid derivative having a cyclic structure, an intended adhesion strength can be obtained regardless of the kind of a base resin thereof.

DESCRIPTION OF EMBODIMENTS

Hereinafter, the present invention will be specifically explained on the basis of preferred embodiments. In this specification, "AA to BB" means AA or more and BB or less. "Melting point" is a value obtained by measurement with a differential scanning calorimeter (hereinafter, this is described as "DSC"). "Weight-average molecular weight" is the value in terms of a standard polystyrene obtained by measurement with a gel permeation chromatography (GPC).

[Modified Polyolefin Resin]

The modified polyolefin resin according to the present invention is a modified product of a polyolefin resin and satisfies the following conditions (A) and (B):

condition (A): a modifying component includes an α,β-unsaturated carboxylic acid derivative having a cyclic structure; and condition (B): a ring-opening degree expressed by the following formula (1) is 40 or more.

$$\text{Ring-opening degree}=\text{modification degree } K \times \text{ring-opening rate } R \quad (1)$$

(In the formula (1), the modification degree K represents a grafting weight (% by weight) of the α,β-unsaturated carboxylic acid derivative, and the ring-opening rate R represents a ring-opening rate (%) of the cyclic structure in the α,β-unsaturated carboxylic acid derivative.)

Because the modified polyolefin resin satisfies the condition (A), this has a structure in which the α,β-unsaturated carboxylic acid derivative having a cyclic structure is graft-polymerized to the polyolefin resin.

Because the modified polyolefin resin satisfies the condition (B), this has a structure in which at least part of the α,β-unsaturated carboxylic acid derivative having a cyclic structure that is introduced into a polyolefin resin is opened. In the present invention, the cyclic structure in the α,β-unsaturated carboxylic acid derivative is opened by a water molecule. Therefore, the open ring structure has a carboxy group. Namely, in the modified polyolefin resin according to the present invention, the ring-opening degree is a parameter relating to an existing amount of the carboxy group in the modified polyolefin resin.

The modified polyolefin resin obtained by modifying a polyolefin resin by using an α,β-unsaturated carboxylic acid derivative having a cyclic structure such as maleic anhydride has been known. However, the heretofore known modified polyolefin resin is the one that utilizes in a chemical reaction the cyclic structure of the α,β-unsaturated carboxylic acid derivative that is introduced into the polyolefin resin so as to express various effects. Therefore, it is preferable that the cyclic structure in the α,β-unsaturated carboxylic acid derivative that is introduced into the polyolefin is not opened. In other words, the ring-opening degree thereof is preferably as low as possible.

On the other hand, in the modified polyolefin resin according to the present invention, the ring-opening degree of the cyclic structure of the α,β-unsaturated carboxylic acid derivative that is introduced into the polyolefin is set to above a specific numerical value. In other words, the ring-opening degree is set to a high value.

The ring-opening degree of the modified polyolefin resin according to the present invention is 40 or more, while preferably 50 or more. When the ring-opening degree is 40 or more, regardless of the kind of the base resin thereof, an intended adhesion strength can be obtained even when a graft polymerization is carried out by using the α,β-unsaturated carboxylic acid derivative having a cyclic structure. The upper limit thereof is preferably 750 or less, while more preferably 700 or less.

Here, the ring-opening degree is defined as a product of the modification degree K and the ring-opening rate R. Details of the modification degree K and the ring-opening rate R are explained below.

The modification degree K represents a grafting weight (° by weight) of the α,β-unsaturated carboxylic acid derivative. Namely, the modification degree K indicates the rate of the α,β-unsaturated carboxylic acid derivative having a cyclic structure that is introduced into the polyolefin resin. The modification degree K can be determined in accordance with the ring-opening degree of the modified polyolefin resin. The modification degree K is preferably 0.1 to 20.0% by weight, while more preferably 0.2 to 10.0% by weight.

The modification degree K can be controlled by, among other things, a modifying component, a use amount of a radical generating agent, a reaction temperature, a reaction time, and the like at the time when the polyolefin resin is modified with a modifying component.

The modification degree K can be calculated as follows by the method in accordance with JIS K-0070 (1992). Namely, about 0.5 g of accurately weighed amount of a modified polyolefin resin and about 100 g of toluene are charged into a 300-mL separable flask equipped with a cooling tube and a thermometer; and then, this is dissolved with stirring and heating on a hot stirrer in such a way as to bring the temperature inside the flask to 80° C. After the resin is dissolved, 15 mL of methanol is added thereto; and then, they are kept as they are for 5 minutes. Then, after 5 to 6 droplets of an indicator (1% phenolphthalene-methanol solution) are added, this is titrated with a 0.1 mol/L potassium hydroxide-ethanol solution. From the titration amount required for neutralization here, the modification degree K of the modified polyolefin resin can be calculated by using the following formula.

$$K=\{B \times f \times F/(S \times 1{,}000)\} \times 100$$

Here, K indicates the modification degree (% by weight), B indicates the titration amount (mL) of the potassium hydroxide-ethanol solution, f indicates a factor of the 0.1 mol/L potassium hydroxide-ethanol solution, F indicates a formula weight of the α,β-unsaturated carboxylic acid derivative multiplied with 1/10, and S indicates the weight (g) of the modified polyolefin resin.

The ring-opening rate R represents a ring-opening rate (%) of the cyclic structure in the α,β-unsaturated carboxylic acid derivative. Namely, the ring-opening rate R represents a ring-opening rate of the α,β-unsaturated carboxylic acid derivative having a cyclic structure that is introduced into the polyolefin resin. The ring-opening rate R can be set in accordance with the ring-opening degree of the modified polyolefin resin. The ring-opening rate R is preferably 10 to 80%, while more preferably 15 to 75%.

The ring-opening rate R can be controlled, for example, with variously changing a temperature and a time, by soaking the modified polyolefin resin in water or by putting the modified polyolefin resin under a constant humidity condition.

The detail of measurement of the ring-opening rate R is as follows.

First, the modified polyolefin resin is dissolved into an organic solvent to obtain a solution. Next, this solution is applied onto a KBr plate, and dried to form a thin film; and then, an infrared absorption spectrum of this film from 400 to 4,000 $cm^{-1}$ is observed with FT-IR (for example, "FT/IR-4100"; manufactured by JASCO Corp.). Analysis thereof is done by a software attached to the instrument (for example, "Spectro Manager"; manufactured by JASCO Corp.).

The peak appeared at the wavenumber of 1,700 to 1,750 $cm^{-1}$ is assigned to a peak originated from a carbonyl group in the ring-opened α,β-unsaturated carboxylic acid derivative, and the peak height thereof is designated by A. The peak appeared at the wavenumber of 1,750 to 1,820 $cm^{-1}$ is assigned to a peak originated from a carbonyl group in the ring-unopened α,β-unsaturated carboxylic acid derivative, and the peak height thereof is designated by B. The ring-opening rate R (%) can be calculated from the formula (A/(A+B)×100). The ring-opening rates in Examples to be described later are the values calculated by this method.

A melting point of the modified polyolefin resin according to the present invention is preferably 50 to 120° C., while more preferably 60 to 110° C. When the melting point is 50° C. or higher, the adhesion property thereof can be sufficiently expressed. On the other hand, when the melting point is 120° C. or lower, the adhesion property at low temperature and the solution stability are so good that the storage stability at low temperature can be sufficiently expressed.

The melting point can be controlled, for example, by a kind of the base resin of the polyolefin resin.

The detail of the measurement of the melting point by DSC is as follows. In accordance with the method described in JIS K7121 (1987), by using a DSC measurement instrument (for example, "DISCOVERY DSC2500": manufactured by TA Instruments Japan Inc.), about 5 mg of a sample is kept under a molten state by heating at 150° C. for 10 minutes. This is cooled at the temperature descending rate of 10° C./minute, and is stably retained at −50° C. for 5 minutes. Then, this is heated at the temperature ascending rate of 10° C./minute till 150° C. to measure a melting peak temperature at the time of melting. This temperature is taken as the melting point. The melting points in Examples to be described later are the values calculated by this method.

The weight-average molecular weight of the modified polyolefin resin according to the present invention is preferably 10,000 to 200,000, while more preferably 20,000 to 180,000.

The weight-average molecular weight thereof can be controlled, for example, by the weight-average molecular weight of the base resin of the polyolefin resin and the use amount of the modifying component.

Detail of the measurement condition of GPC is as follows. The weight-average molecular weights of the modified polyolefin resins in Examples to be described later are the values measured with this condition.

Measurement instrument: HLC-8320 GPC (manufactured by Tosoh Corp.)

Eluting solution: tetrahydrofuran

Column: TSKgel (manufactured by Tosoh Corp.)

Standard substance: polystyrene (manufactured by Tosoh Corp. and GL Sciences Inc.)

Detector: differential refractometer (manufactured by Tosoh Corp.).

(Polyolefin Resin)

There is no particular restriction in the polyolefin resin. A α-olefin is preferably used as the olefin to constitute the polyolefin resin. Illustrative examples of the α-olefin include ethylene, propylene, 1-butene, 1-pentene, 1-hexene, 1-heptene, and 1-octene.

The polyolefin resin may be a polymer of a single olefin or a copolymer formed of two or more olefin polymers.

When the polyolefin resin is the copolymer, the polyolefin resin may be any of a random copolymer and a block copolymer.

From a viewpoint to sufficiently express the adhesion property to a non-polar resin substrate such as a polypropylene substrate, the polyolefin resin is more preferably polypropylene (propylene homopolymer), an ethylene-propylene copolymer, a propylene-1-butene copolymer, and an ethylene-propylene-1-butene copolymer.

In this specification, "polypropylene" represents a polymer whose basic unit is a composition unit derived from propylene. "Ethylene-propylene copolymer" represents a copolymer whose basic units are composition units derived from ethylene and propylene. "Propylene-1-butene copolymer" represents a copolymer whose basic units are composition units derived from propylene and butene. "Ethylene-propylene-1-butene copolymer" represents a copolymer whose basic units are composition units derived from ethylene, propylene, and butene. These (co)polymers may include a small amount of a composition unit derived from an olefin other than these basic units. The content thereof is permissible so far as the inherent performance of the resin itself is not badly damaged.

Preferably, the polyolefin resin includes 50% or more by mole of the composition unit derived from propylene, relative to 100% by mole of the composition units. When the content of the composition unit derived from propylene is in the range described above, the adhesion property to a non-polar resin substrate such as a propylene resin can be retained.

Preferably, the polyolefin resin is the one obtained by using a metallocene catalyst as a polymerization catalyst.

A publicly known metallocene catalyst may be used. Preferably, the metallocene catalyst is the one that is obtained from a combination of components (1) and (2), and as necessary, a component (3), as described below.

Component (1): a metallocene complex formed of a transition metal compound having at least one conjugated 5-membered ring ligand and a metal belonging to the 4 to 6 groups in the periodic table.

Component (2): an ion-exchangeable layered silicate salt.

Component (3): an organic aluminum compound.

When the metallocene catalyst is used, the polyolefin resin has the following characteristics. A molecular weight distribution of the polyolefin resin becomes narrower. When the polyolefin resin is a copolymer, random copolymerizability becomes excellent, a composition distribution becomes narrow, and a range of copolymerizable comonomers becomes wide.

When the ethylene-propylene copolymer or the propylene-1-butene copolymer is a random copolymer, it is preferable that the copolymer include the composition unit derived from ethylene or the composition unit derived from butene with the amount of 5 to 50% by mole and the composition unit derived from propylene with the amount of 50 to 95% by mole, relative to 100% by mole of the composition units.

The weight-average molecular weight of the polyolefin resin may be appropriately set in accordance with the weight-average molecular weight of the modified polyolefin resin. For example, when the weight-average molecular weight of the modified polyolefin resin is preferably 10,000 to 200,000, while more preferably 20,000 to 180,000, preferably the weight-average molecular weight of the polyolefin resin is controlled in such a way that the weight-average molecular weight of the modified polyolefin resin thereby obtained may fall in this range. More specifically, it is preferable to control the weight-average molecular weight of the polyolefin resin in such a way as to fall into a suitable range, for example, 200,000 or less, by degrading thereof in the presence of a heat or a radical.

Here, the weight-average molecular weight of the polyolefin resin is the value measured with a similar manner described before by using the gel permeation chromatography (GPC, standard substance: polystyrene). The measurement conditions are the same as those described before.

The lower limit of the melting point of the polyolefin resin is preferably 50° C. or higher, while more preferably 60° C. or higher. When the melting point of the polyolefin resin is 50° C. or higher, this can sufficiently express a coat film strength upon using the modified polyolefin resin for an ink, a paint, or the like.

Therefore, a sufficient adhesion property to a substrate can be expressed. When this is used as an ink, blocking can be suppressed during printing. The upper limit thereof is preferably 120° C. or lower, while more preferably 110° C. or lower. When the melting point of the polyolefin resin is 120° C. or lower, the coat film can be suppressed from excessive hardening upon using the modified polyolefin resin for an ink, a paint, or the like. Therefore, the coat film can express a suitable flexibility.

In one embodiment, the melting point of the polyolefin resin is preferably 50 to 120° C., while more preferably 60 to 110° C.

The melting point of the polyolefin resin can be measured by using the DSC measurement instrument (for example, "DISCOVERY DSC2500": manufactured by TA Instruments Japan Inc.). More specifically, about 5 mg of a sample is melted at 150° C. for 10 minutes, and then, this is cooled at the temperature descending rate of 10° C./minute till −50° C. to crystallize. Then, this is heated at the temperature ascending rate of 10° C./minute till 150° C. to melt. A melting peak temperature at the time of melting can be obtained as the melting point.

(Modifying Component)

The modifying component includes the α,β-unsaturated carboxylic acid derivative having a cyclic structure. Illustrative examples of the α,β-unsaturated carboxylic acid derivative having a cyclic structure include α,β-unsaturated carboxylic acid anhydrides having a cyclic structure, such as maleic anhydride, citraconic anhydride, itaconic anhydride, and aconitic anhydride. Among these, maleic anhydride is preferable.

The modifying component may include components other than the α,β-unsaturated carboxylic acid derivative having a cyclic structure. Illustrative examples thereof include α,β-unsaturated carboxylic acids such as maleic acid, fumaric acid, citraconic acid, mesaconic acid, itaconic acid, and aconitic acid; (meth)acrylate esters such as methyl (meth)acrylate, ethyl (meth)acrylate, n-butyl (meth)acrylate, cyclohexyl (meth)acrylate, hydroxyethyl (meth) acrylate, isobornyl (meth) acrylate, glycidyl (meth)acrylate, octyl (meth) acrylate, lauryl (meth)acrylate, tridecyl (meth)acrylate, stearyl (meth)acrylate, benzyl (meth)acrylate, phenyl (meth) acrylate, dimethylaminoethyl (meth) acrylate, diethylaminoethyl (meth) acrylate, 2-hydroxyethyl (meth) acrylate, N,N-dimethylaminoethyl (meth) acrylate, and acetoacetoxyethyl (meth) acrylate; and monomethyl fumarate, monoethyl fumarate, monopropyl fumarate, monobutyl fumarate, dimethyl fumarate, diethyl fumarate, dipropyl fumarate, dibutyl fumarate, monomethyl maleate, monoethyl maleate, monopropyl maleate, monobutyl maleate, dimethyl maleate, diethyl maleate, dipropyl maleate, dibutyl maleate, maleimide, and N-phenyl maleimide.

Modification of the polyolefin resin by the modifying component may be done by a heretofore known method. Illustrative examples of the method like this include a method in which the polyolefin resin is melted or dissolved into a solvent, which is then followed by addition of a modifying component and a radical generating agent to carry out the modification.

As for the reaction apparatus, an extruding machine such as a biaxial extruder may be used.

The reaction may be carried out with any of a batch-wise system and a continuous system.

When the polyolefin resin is modified with the modifying component, usually, a graft polymer having a polyolefin as a main chain and a composition unit derived from the modifying component as a side chain can be obtained.

[Production Method]

The method for producing the modified polyolefin resin according to the present invention is not particularly restricted. One example thereof is described below.

First, a polyolefin resin is prepared. This polyolefin resin can be prepared by polymerizing an α-olefin such as ethylene, propylene, 1-butene, 1-pentene, 1-hexene, 1-heptene, or 1-octene in the presence of a catalyst such as a Ziegler-Natta catalyst or a metallocene catalyst. A commercially available polyolefin resin may be used as well.

Next, the polyolefin resin is modified by using the modifying component. The modification may be done by a heretofore known modification method such as, for example, a graft polymerization method. Upon carrying out the graft polymerization reaction, a radical generating agent may be used. Illustrative examples of the method to obtain the modified polyolefin resin include: a solution method in which the modifying component is dissolved by heating into a solvent such as toluene followed by addition of the radical generating agent to the resulting mixture; and a melt kneading method in which the modifying component and the radical generating agent are added into a machine such as a Banbury mixer, a kneader, or an extruder thereby kneading them in the machine. Here, the modifying component may be added all at once or consecutively.

Upon carrying out the graft polymerization reaction, in view of grafting with a suitable amount, the amount of the modifying component is preferably 0.1 to 20 parts by mass relative to 100 parts by mass of the polyolefin resin.

The radical generating agent that can be used may be arbitrarily selected from heretofore known radical generating agents. Among these, an organic peroxide compound is preferable. Illustrative examples of the organic peroxide compound include di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butylperoxy benzoate, t-butylperoxy isobutyrate, t-butylperoxy-3,5,5-trimethyl hexanoate, t-butylperoxy-2-ethyl hexanoate, t-butylperoxy isopropyl carbonate, cumylperoxy octoate, and 2,5-dimethyl-2,5-bis(t-butylperoxy)hexane. Among these, di-t-butyl peroxide, dilauryl peroxide, and 2,5-dimethyl-2,5-bis(t-butylperoxy)hexane are preferable.

Preferable range of the addition amount of the radical generating agent relative to 100% by mass of the modifying component is as follows. The lower limit of the addition amount thereof is preferably 1% or more by mass, while more preferably 10% or more by mass. When the addition amount of the radical generating agent is 1% or more by mass, the grafting efficiency can be retained. On the other hand, the upper limit of the addition amount is preferably 200% or less by mass, while more preferably 100% or less by mass. When the addition amount of the radical generating agent is 200% or less by mass, this is economical.

Unreacted substance, i.e., the modifying component not involved in the graft polymerization to the polyolefin resin, may be removed by extraction with, for example, a poor solvent. In the way as described above, the graft polymer can be obtained.

The modified polyolefin resin according to the present invention can be produced by causing the thus obtained graft polymer to react with a water molecule in such a way as to satisfy the condition (B). More specifically, this can be produced by opening of the ring. This ring opening may be done, for example, by soaking the modified polyolefin resin in water, or putting the modified polyolefin resin under a constant humidity condition. At this time, the ring-opening rate (%) and the ring-opening degree can be controlled by changing the water temperature as well as the temperature and humidity in the process condition, and also by changing the soaking time and the period during which the modified polyolefin resin is put under a constant humidity condition.

The modified polyolefin resin according to the present invention is useful as an intermediate medium for a substrate having a difficulty to be applied with a paint or the like because of a poor attaching property (adhesion property). Therefore, this can be used as an adhesive to adhere polyolefin type substrates having a poor attaching property (adhesion property) to each other, such as polypropylene and polyethylene. Here, this can be used for the substrate regardless of whether the surface thereof is treated with plasma, corona, or the like. In addition, when the modified polyolefin resin according to the present invention is laminated onto the surface of the polyolefin type substrate by a hot-melt method followed by coating thereon with a paint or the like, an adhesion stability or the like of the paint may be enhanced.

In addition, the modified polyolefin resin according to the present invention can express a superior adhesion property between a metal and a resin.

Illustrative examples of the metal include aluminum, an aluminum alloy, nickel, and a stainless steel.

Illustrative examples of the resin include non-polar resins such as polyolefin resins, as well as polyurethane type resins, polyamide type resins, acrylic resins, and polyester type resins. Therefore, the modified polyolefin resin according to the present invention can be used as an adhesive, a primer, a paint binder, and an ink binder, or as a component included therein.

[Composition]

The modified polyolefin resin according to the present invention is usually used as a composition that includes the modified polyolefin resin. Preferably, the composition further includes, besides the modified polyolefin resin, at least one ingredient selected from the group consisting of a solution, a curing agent, and an adhesive component.

(Solution)

One embodiment of the composition is a resin composition that includes the modified polyolefin resin and a solution. Illustrative examples of the solution include an organic solvent. Illustrative examples of the organic solvent include aromatic solvents such as toluene and xylene; ester solvents such as ethyl acetate and butyl acetate; ketone solvents such as methyl ethyl ketone, methyl butyl ketone, and ethyl cyclohexanone; and aliphatic or alicyclic hydrocarbon solvents such as cyclohexane, methyl cyclohexane, nonane, and decane. In view of an environmental concern, organic solvents other than aromatic solvents are preferable, while a mixed solvent of an alicyclic hydrocarbon solvent with an ester solvent or with a ketone solvent is more preferable.

These organic solvents may be used singly or as a mixed solvent of two or more of them.

In addition, in order to enhance a storage stability of the resin composition solution that includes the modified polyolefin resin and the solution, alcohols (for example, methanol, ethanol, propanol, isopropyl alcohol, and butanol), and propylene type glycol ethers (for example, propylene glycol methyl ether, propylene glycol ethyl ether, and propylene glycol t-butyl ether) may be used singly or as a mixture of two or more of them. In this case, the addition amount thereof is preferably 1 to 20% by mass relative to the organic solvent described before.

(Curing Agent)

Another embodiment of the composition is a composition that includes the modified polyolefin resin and a curing agent. Illustrative examples of the curing agent include polyisocyanate compounds, epoxy compounds, polyamine compounds, polyol compounds, and crosslinking agents having these functional groups that are blocked by a protecting group.

The curing agent may be used singly or as a combination of plurality of these curing agents.

A blending amount of the curing agent can be arbitrarily selected in accordance with the modification degree K of the modified polyolefin resin. When the curing agent is blended thereto, a catalyst such as an organic tin compound or a tertiary amine compound may be concurrently used in accordance with the purpose thereof.

(Adhesive Component)

Still another embodiment of the composition is an adhesive composition that includes the modified polyolefin resin and an adhesive component. A heretofore known adhesive component such as a polyester type adhesive, a polyurethane type adhesive, or an acrylic adhesive may be used so far as the intended effects are not impaired.

The composition is superior in adhesion of non-polar resins such as polyolefin substrates to each other as well as between a non-polar resin and a metal. Therefore, the composition can be used as an adhesive, a primer, a paint binder, and an ink binder; and thus, this is useful as an adhesive in a laminate film such as an aluminum laminate film.

[Primer and Binder]

The modified polyolefin resin according to the present invention or the composition described above can be used as a primer, a paint binder, or an ink binder. The modified polyolefin resin according to the present invention or the composition including this resin has a superior adhesion property, solution stability, and heat resistance.

Therefore, they can be suitably used as a primer for over-coating to a polyolefin substrate such as an automobile bumper, and as a paint binder having a superior adhesion with an over-coat paint or with a clear coat.

The primer, the paint binder, or the ink binder may be used in the form corresponding to the use thereof, for example, as in the form of a solution, a powder, or a sheet. In addition, at this time, an additive such as an antioxidant, a light stabilizer, a UV absorber, a pigment, a dye, an inorganic filling material, or the like can be added, as needed.

[Laminate Body]

The modified polyolefin resin according to the present invention or the composition including this may be used as a laminate body. The laminate body usually has a layer including the modified polyolefin resin or the composition described above, a metal layer, and a resin layer. Arrangement of these layers in the laminate body is not particularly restricted; illustrative examples thereof include: an embodiment in which the metal layer and the resin layer are arranged in such a way as to interpose therebetween the layer including the modified polyolefin resin or the layer including the composition; and an embodiment in which there are a first resin layer and a second resin layer that are arranged in such a way as to interpose the metal layer therebetween, and whereby the layer including the modified polyolefin resin or the composition is interposed between the metal layer and each of the resin layers. The laminate body may also be used for an exterior material of a lithium ion secondary battery, a condenser, an electric double-layered capacitor, or the like.

EXAMPLES

Hereinafter, the present invention will be explained specifically by Examples. Examples below are described in order to properly explain the present invention, not to limit the present invention. Hereinafter, "part" means part by weight unless otherwise specifically mentioned.

[Modification degree K (% by weight)]: The modification degree K was calculated as follows by the method in accordance with JIS K-0070 (1992). First, about 0.5 g of an accurately weighed amount of a modified polyolefin resin and about 100 g of toluene were charged into a 300-mL separable flask equipped with a cooling tube and a thermometer; and then, this was dissolved with stirring and heating on a hot stirrer in such a way as to bring the temperature inside the flask to 80° C. After the resin was dissolved, 15 mL of methanol was added thereto; and then, the mixture was kept as it was for 5 minutes. Then, after 5 to 6 droplets of an indicator (1% phenolphthalene-methanol solution) were added, the mixture was titrated with a 0.1 mol/L potassium hydroxide-ethanol solution. From the titration amount required for neutralization, the modification degree K in the modified polyolefin resin was calculated using the following formula.

$$K=\{B \times f \times 9.806/(S \times 1{,}000)\} \times 100$$

Here, K indicates the modification degree (% by weight), B indicates the titration amount (mL) of the potassium hydroxide-ethanol solution, f indicates a factor of the 0.1 mol/L potassium hydroxide-ethanol solution, 9.806 indicates a formula weight of maleic anhydride multiplied with $1/10$, and S indicates the weight (g) of the modified polyolefin resin.

[Ring-opening rate R (%)]: The modified polyolefin resin was dissolved into an organic solvent to obtain a solution. Next, this solution was applied onto a KBr plate, and dried to form a thin film; and then, an infrared absorption spectrum of this film from 400 to 4,000 cm$^{-1}$ was observed with FT-IR ("FT/TR-4100"; manufactured by JASCO Corp.). Analysis thereof was done by a software attached to the instrument ("Spectro Manager"; manufactured by JASCO Corp.).

The peak appeared at the wavenumber of 1,700 to 1,750 cm$^{-1}$ was assigned to a peak originated from a carbonyl group in the ring-opened α,β-unsaturated carboxylic acid derivative, and the peak height thereof was designated by A. The peak appeared at the wavenumber of 1,750 to 1,820 cm$^{-1}$ was assigned to a peak originated from a carbonyl group in the ring-unopened α,β-unsaturated carboxylic acid derivative, and the peak height thereof was designated by B.

The ring-opening rate R (%) was calculated from the formula (A/(A+B)×100) by substituting A and B with respective peak heights.

[Ring-opening degree]: This was calculated as a product of the modification degree K and the ring-opening rate R.

[Melting point (° C.)]: In accordance with the method described in JIS K7121 (1987), by using a DSC measurement instrument ("DISCOVERY DSC2500": manufactured by TA Instruments Japan Inc.), about 5 mg of a sample was kept under a molten state by heating at 150° C. for 10 minutes. This was cooled at the temperature descending rate of 10° C./minute, and was stably kept at −50° C. Then, this was heated at the temperature ascending rate of 10° C./minute till 150° C. to measure a melting peak temperature at the time of melting. This temperature was evaluated as the melting point.

[Weight-average molecular weight (Mw)]: This is the value measured with the following measurement condition.

Measurement instrument: HLC-8320 GPC (manufactured by Tosoh Corp.)

Eluting solution: tetrahydrofuran Column: TSKgel (manufactured by Tosoh Corp.)

Standard substance: polystyrene (manufactured by Tosoh Corp. and GL Sciences Inc.)

Detector: differential refractometer (manufactured by Tosoh Corp.)

Temperature: 40° C.

Flow rate: 1.0 mL/minute

EXAMPLE 1

In a four-neck flask equipped with an agitator, a cooling tube, and a dropping funnel, 100 parts (60 g) of a propylene-butene random copolymer [P-B] (80% by mole of propylene component and 20% by mole of butene component: Tm=85° C.) was dissolved into 400 g of toluene with heating. While keeping the temperature in the system at 110° C., 4.5 parts of maleic anhydride, 4.0 parts of lauryl methacrylate, and 1.0 part of di-t-butyl peroxide each were added dropwise for the period of 3 hours with stirring. The reaction was further continued for 1 hour.

After completion of the reaction, the reaction mixture was cooled to room temperature to obtain a reaction product having the weight-average molecular weight of 160,000 and Tm=82° C. The reaction product was purified by pouring this into a large excess of acetone. The grafting weights of maleic anhydride and lauryl methacrylate in the product were measured to be 4.0% by weight and 3.0% by weight, respectively.

The reaction product was allowed to leave under constant temperature and humidity (50° C. and 100% RH) for 5 hours to obtain a modified polyolefin resin having the ring-opening rate of 24.1%, i.e., 96.4 as the ring-opening degree.

Example 2

The reaction was carried out in the same way as Example 1, except that 2.0 parts of maleic anhydride, 2.0 parts of lauryl methacrylate, and 0.8 part of di-t-butyl peroxide were used, to obtain a reaction product having the molecular weight of 150,000 and Tm=83° C., in which the grafting amounts of maleic anhydride and lauryl methacrylate were 1.9% by weight and 1.8% by weight, respectively.

The reaction product was allowed to leave under constant temperature and humidity (50° C. and 100% RH) for 16 hours to obtain a modified polyolefin resin having the ring-opening rate of 54.3%, i.e., 103.2 as the ring-opening degree.

Example 3

By using a biaxial extruder at 170° C., 100 parts of a propylene-butene random copolymer [P-B] (80° by mole of propylene component and 20° by mole of butene component; Tm=75° C.), 2.0 parts of maleic anhydride, and 1.0 part of di-t-butyl peroxide were kneaded to carry out the reaction. Degassing in the extruder was carried out by evacuation to remove unreacted substances, and a reaction product having the weight-average molecular weight of 140,000 and Tm=73° C. was obtained. The reaction product was purified by pouring this into a large excess of acetone. The grafting weight of maleic anhydride in the product was measured to be 1.8% by weight.

The reaction product was allowed to leave under constant temperature and humidity (50° C. and 100% RH) for 48 hours to obtain a modified polyolefin resin having the ring-opening rate of 70.4%, i.e., 126.7 as the ring-opening degree.

Example 4

The reaction product before adjustment of the ring-opening rate obtained in Example 2 was allowed to leave under constant temperature and humidity (50° C. and 100% RH) for 48 hours to obtain a modified polyolefin resin having the ring-opening rate of 71.3%, i.e., 135.5 as the ring-opening degree.

Example 5

The reaction product before adjustment of the ring-opening rate obtained in Example 1 was allowed to leave under constant temperature and humidity (50° C. and 100% RH) for 18 hours to obtain a modified polyolefin resin having the ring-opening rate of 49.8%, i.e., 199.2 as the ring-opening degree.

Example 6

The reaction product before adjustment of the ring-opening rate obtained in Example 1 was allowed to leave under constant temperature and humidity (50° C. and 100% RH) for 48 hours to obtain a modified polyolefin resin having the ring-opening rate of 68.6%, i.e., 274.4 as the ring-opening degree.

EXAMPLE 7

100 parts of a propylene-ethylene random copolymer [P-E] (89% by mole of propylene component and 11% by mole of ethylene component; Tm=65° C.), 4.0 parts of maleic anhydride, 4.0 parts of lauryl methacrylate, and 2.0 parts of di-t-butyl peroxide were kneaded by using a biaxial extruder at 170° C. to carry out the reaction. Degassing in the extruder was carried out by evacuation to remove remaining unreacted substances, and a reaction product having the weight-average molecular weight of 130,000 and Tm=64° C. was obtained. The reaction product was purified by pouring this into a large excess of acetone. The grafting weights of maleic anhydride and lauryl methacrylate in the product were measured to be 3.3% by weight and 2.5% by weight, respectively.

The reaction product was allowed to leave under constant temperature and humidity (50° C. and 100% RH) for 5 hours to obtain a modified polyolefin resin having the ring-opening rate of 23.4%, i.e., 77.2 as the ring-opening degree.

Example 8

In a four-neck flask equipped with an agitator, a cooling tube, and a dropping funnel, 100 parts (60 g) of a propylene-ethylene random copolymer [P-E] (87% by mole of propylene component and 13% by mole of ethylene component; Tm=70° C.) was dissolved into 400 g of toluene with heating. While keeping the temperature in the system at 110° C., 4.0 parts of maleic anhydride and 2.0 parts of dilauryl peroxide each were added dropwise for the period of 3 hours with stirring. The reaction was further continued for 1 hour.

After completion of the reaction, the reaction mixture was cooled to room temperature to obtain a reaction product having the weight-average molecular weight of 65,000 and Tm=65° C. The reaction product was purified by pouring this into a large excess of acetone. The grafting weight of maleic anhydride was measured to be 3.8% by weight.

The reaction product was allowed to leave under constant temperature and humidity (50° C. and 100% RH) for 5 hours to obtain a modified polyolefin resin having the ring-opening rate of 25.3%, i.e., 96.1 as the ring-opening degree.

Example 9

The reaction product before adjustment of the ring-opening rate obtained in Example 7 was allowed to leave under constant temperature and humidity (50° C. and 100° RH) for 17 hours to obtain a modified polyolefin resin having the ring-opening rate of 52.0%, i.e., 171.6 as the ring-opening degree.

Example 10

The reaction product before adjustment of the ring-opening rate obtained in Example 7 was allowed to leave under constant temperature and humidity (50° C. and 100% RH) for 48 hours to obtain a modified polyolefin resin having the ring-opening rate of 72.8%, i.e., 240.2 as the ring-opening degree.

EXAMPLE 11

In a four-neck flask equipped with an agitator, a cooling tube, and a dropping funnel, 100 parts (60 g) of a propylene-ethylene random copolymer [P-E] (87% by mole of propylene component and 13% by mole of ethylene component; Tm=70° C.) was dissolved into 400 g of toluene with heating. While keeping the temperature in the system at 110° C., 10.0 parts of maleic anhydride, 9.0 parts of octyl methacrylate, and 3.0 parts of dilauryl peroxide each were added dropwise for the period of 3 hours with stirring. The reaction was further continued for 1 hour.

After completion of the reaction, the reaction mixture was cooled to room temperature to obtain a reaction product having the weight-average molecular weight of 100,000 and Tm=63° C. The reaction product was purified by pouring this into a large excess of acetone. The grafting weights of maleic anhydride and octyl methacrylate in the product were measured to be 8.7% by weight and 6.0% by weight, respectively.

The reaction product was allowed to leave under constant temperature and humidity (50° C. and 100% RH) for 5 hours to obtain a modified polyolefin resin having the ring-opening rate of 18.8%, i.e., 163.6 as the ring-opening degree.

Example 12

The reaction product before adjustment of the ring-opening rate obtained in Example 11 was allowed to leave under constant temperature and humidity (50° C. and 100% RH) for 48 hours to obtain a modified polyolefin resin having the ring-opening rate of 70.5%, i.e., 613.4 as the ring-opening degree.

Comparative Example 1

The reaction product before adjustment of the ring-opening rate obtained in Example 2 was allowed to leave under constant temperature and humidity (50° C. and 100% RH) for 3 hours to obtain a modified polyolefin resin having the ring-opening rate of 14.9%, i.e., 28.3 as the ring-opening degree.

Comparative Example 2

The reaction product before adjustment of the ring-opening rate obtained in Example 3 was allowed to leave under constant temperature and humidity (50° C. and 100% RH) for 3 hours to obtain a modified polyolefin resin having the ring-opening rate of 14.5%, i.e., 26.1 as the ring-opening degree.

Comparative Example 3

The reaction product before adjustment of the ring-opening rate obtained in Example 7 was allowed to leave under constant temperature and humidity (50° C. and 100% RH) for 1 hour to obtain a modified polyolefin resin having the ring-opening rate of 8.9%, i.e., 29.4 as the ring-opening degree.

The kinds of the base resins, the modification degrees K (% by weight), the ring-opening rates R (%), and the ring-opening degrees of the modified polyolefin resins obtained in Examples 1 to 12 and Comparative Examples 1 to 3 are summarized in Table 1.

TABLE 1

|  | Base resin | Modification degree K (% by weight) | Ring-opening rate (%) | Ring-opening degree |
|---|---|---|---|---|
| Comparative Example 1 | P-B | 1.9 | 14.9 | 28.3 |
| Comparative Example 2 | P-B | 1.8 | 14.5 | 26.1 |
| Example 1 | P-B | 4.0 | 24.1 | 96.4 |
| Example 2 | P-B | 1.9 | 54.3 | 103.2 |
| Example 3 | P-B | 1.8 | 70.4 | 126.7 |
| Example 4 | P-B | 1.9 | 71.3 | 135.5 |
| Example 5 | P-B | 4.0 | 49.8 | 199.2 |
| Example 6 | P-B | 4.0 | 68.6 | 274.4 |
| Comparative Example 3 | P-E | 3.3 | 8.9 | 29.4 |
| Example 7 | P-E | 3.3 | 23.4 | 77.2 |
| Example 8 | P-E | 3.8 | 25.3 | 96.1 |
| Example 9 | P-E | 3.3 | 52.0 | 171.6 |
| Example 10 | P-E | 3.3 | 72.8 | 240.2 |
| Example 11 | P-E | 8.7 | 18.8 | 163.6 |
| Example 12 | P-E | 8.7 | 70.5 | 613.4 |

[Heat seal strength (gf)]: A solution sample of the modified polyolefin resin prepared as described above (solid content: 15%, solvent composition: methyl cyclohexane/MEK=80/20 (w/w)) was applied as an adhesive onto an aluminum foil by means of a #16 Meyer bar in such a way as to give a dried resin film thickness of 2 and then, this was dried at 180° C. for 10 seconds. The aluminum foil having been applied with the adhesive was bonded with a cast polypropylene (CPP) sheet. Then, this was adhered by hot-pressing with the conditions (temperature, time, and pressure) described in Table 2; and then, this was cut out to prepare a specimen having the width of 15 mm. After the specimen was stored under constant temperature and humidity conditions at 23° C. and relative humidity of 50% for 24 hours, the laminate adhesion strength thereof was measured with the peeling angle of 180° and the peeling speed of 100 mm/minute. The results thereof are summarized in Table 2.

TABLE 2

|  | Heat seal strength (gf/15 mm) | |
|---|---|---|
|  | 140° C. 2 Kgf · 3 s | 200° C. 1 Kgf · 1 s |
| Comparative Example 1 | 260 | 478 |
| Comparative Example 2 | 280 | 463 |
| Example 1 | 436 | 785 |
| Example 2 | 830 | 1235 |
| Example 3 | 851 | 1250 |
| Example 4 | 882 | 1337 |
| Example 5 | 834 | 1194 |
| Example 6 | 1056 | 1465 |
| Comparative Example 3 | 354 | 550 |
| Example 7 | 989 | 1520 |
| Example 8 | 1020 | 1610 |
| Example 9 | 1448 | 2193 |
| Example 10 | 1843 | 2145 |
| Example 11 | 783 | 786 |
| Example 12 | 883 | 957 |

It can be seen from the results of Comparative Examples 1 to 3 that, when the value of the ring-opening degree is 40 or less, the value of the heat seal strength is low. On the other hand, it can be seen from the results of Examples 1 to 6 that, when the value of the ring-opening degree becomes larger, the value of the heat seal strength also becomes larger thereby leading to enhancement of the adhesion property.

It can be seen from the results of Examples 7 to 12 that, when the modification degree K (% by weight) becomes larger (namely, when the grafting weight increases), the value of the heat seal strength decreases, but the adhesion property can be enhanced by controlling the ring-opening degree within the prescribed range.

The invention claimed is:

1. A modified polyolefin resin, which is a modified product of a polyolefin resin and satisfies (A) and (B):
   (A): a modifying component comprises (a1) an α,β-unsaturated carboxylic acid derivative having a cyclic structure and (a2) a (meth)acrylate ester; and
   (B): a ring-opening degree expressed by formula (1) is 40 or more, $$D_{ro} = K_{md} \times R_{ro} \quad (1),$$

wherein, in the formula (1), $D_{ro}$ is the ring-opening degree, $K_{md}$ is the modification degree K representing a grafting weight, in % by weight, of the α,β-unsaturated carboxylic acid derivative (a1), and $R_{ro}$ is the ring-opening rate R which is a ring-opening rate (%) of the cyclic structure in the α,β-unsaturated carboxylic acid derivative (a1), $R_{ro}$ being 80% or less.

2. The resin of claim 1, having a melting point of 50° C. or higher.

3. The resin of claim 1, having a weight-average molecular weight of 10,000 or more.

4. The resin of claim 2, having a weight-average molecular weight of 10,000 or more.

5. The resin of claim 1, wherein $R_{ro}$ is in a range of from 10 to 80%.

6. The resin of claim 1, wherein $R_{ro}$ is in a range of from 10 to 75%.

7. The resin of claim 1, wherein $R_{ro}$ is in a range of from 15 to 80%.

8. The resin of claim 1, wherein $R_{ro}$ is in a range of from 15 to 75%.

9. The resin of claim 1, wherein $D_{ro}$ is 50 or more.

10. The resin of claim 1, wherein $D_{ro}$ is in a range of from 40 to 750.

11. The resin of claim 1, wherein $D_{ro}$ is in a range of from 50 to 750.

12. The resin of claim 1, wherein $D_{ro}$ is in a range of from 40 to 700.

13. The resin of claim 1, wherein $D_{ro}$ is in a range of from 50 to 700.

14. The resin of claim 1, having a weight-average molecular weight in a range of from 10,000 to 200,000.

15. The resin of claim 1, having a weight-average molecular weight in a range of from 20,000 to 180,000.

16. The resin of claim 1, wherein the modifying component is in a range of from 0.1 to 20 parts by mass relative to 100 parts by mass of the polyolefin resin.

17. The resin of claim 1, wherein $R_{ro}$ is in a range of from 23.4 to 72.8%.

18. The resin of claim 1, wherein the polyolefin resin is a propylene-butene random copolymer.

19. The resin of claim 1, wherein the polyolefin resin is a propylene-ethylene random copolymer.

20. The resin of claim 1, wherein the (meth)acrylate ester (a2) comprises methyl (meth)acrylate, ethyl (meth)acrylate, n-butyl (meth)acrylate, cyclohexyl (meth)acrylate, hydroxyethyl (meth) acrylate, isobornyl (meth) acrylate, glycidyl (meth)acrylate, octyl (meth)acrylate, lauryl (meth)acrylate, tridecyl (meth)acrylate, stearyl (meth)acrylate, benzyl (meth)acrylate, phenyl (meth) acrylate, dimethylaminoethyl (meth) acrylate, diethylaminoethyl (meth) acrylate, 2-hydroxyethyl (meth) acrylate, N,N-dimethylaminoethyl (meth) acrylate, and/or acetoacetoxyethyl (meth) acrylate.

* * * * *